Aug. 16, 1932.   E. D. HALE   1,872,574
CARBON DIOXIDE DRUM VALVE
Filed April 18, 1931
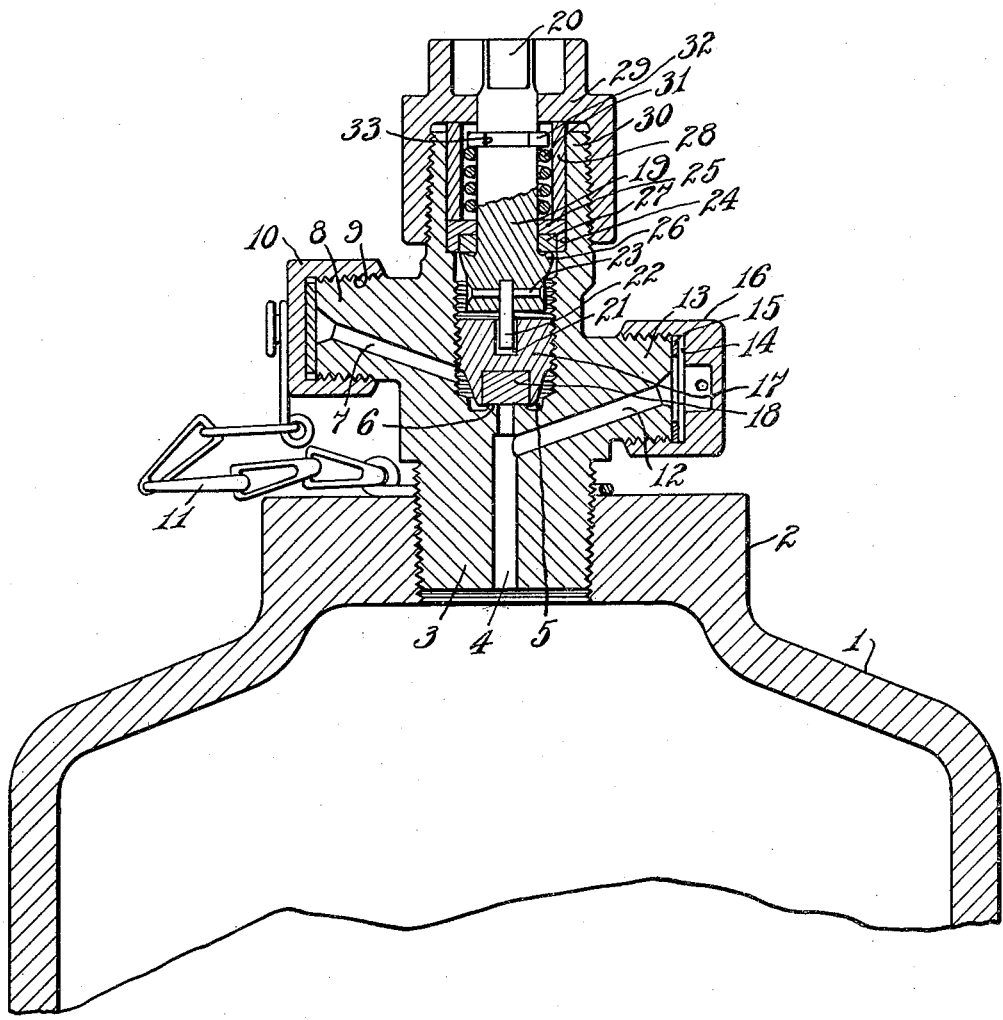
Inventor
Edwin D. Hale,
By Hood + Hahn
Attorneys Patented Aug. 16, 1932

1,872,574

UNITED STATES PATENT OFFICE

EDWIN D. HALE, OF OAK PARK, ILLINOIS, ASSIGNOR TO THE LIQUID CARBONIC CORPORATION, OF CHICAGO, ILLINOIS, A CORPORATON OF DELAWARE

CARBON DIOXIDE DRUM VALVE

Application filed April 18, 1931. Serial No. 531,146.

My invention relates to improvements in valves and particularly to valves for drums containing carbon dioxide and gas of like character.

The gas contained in carbon dioxide drums is generally under extremely high pressure and it has heretofore been found difficult to provide a valve for controlling the delivery of the gas from these drums, which valve will be gas tight.

It is one of the objects of my invention to provide a valve for drums of the above character which, while being gas tight may be at the same time easily and readily operable. For the purpose of disclosing my invention I have illustrated in the accompanying drawing a valve embodying my invention and in said drawing:

The figure is a longitudinal section of such a valve.

In the structure illustrated the drum 1 is provided with the usual neck 2 in which is fitted a valve body 3, preferably screw threaded in the neck in such a manner as to form a gas tight seal at the junction point. This body 3 is provided with a port 4 terminating in a chamber 5 provided with a valve seat 6. The chamber is provided with a port 7 terminating in a nipple 8 exteriorly screw threaded as at 9 to receive a connection with a suitable supply pipe. During transportation the thread of this nipple 8 is protected by a cap 10 threaded in position and attached, against loss when removed, to the stem by a chain connection 11.

The port 4 has a branch 12 extending into a nipple 13 and this port is normally closed by a bronze disc 14 seated on a fiber washer 15 and held in position by a screw cap 16 which cap is provided with escape openings. This provides a safety blowoff so that in event the pressure in the drum exceeds a predetermined amount, the copper or bronze disc will break under the excess pressure permitting the escape of the gas.

The port 4 is controlled by a valve member 17 screw threaded into the chamber 5 and provided at its lower end with a hard rubber noze 18 adapted when the member 17 is screwed down to engage the seat 6, sealing the port 4. This valve member 17 is operated by a stem 19, the upper end of which is of irregular shape as at 20 to receive an operating key. The top of the valve member 17 has a transversely extending slot 21 into which engages a preferably rectangular key 22, seating in a transverse slot in the stem 19 and secured therein by a pin 23. By this arrangement when the stem 19 is rotated the valve member 18 will likewise be rotated and at the same time there is a certain amount of relative vertical movement permitted between the stem and the valve member. Surrounding the valve stem 19 is a seating ring 24 having an annular shoulder 25 between which and a shoulder 26 on the stem, is interposed a preferable leather ring washer 27. This ring member 24 is maintained against vertical displacement by a tubular holder 28 interposed between the top of the ring member and the closure cap 29, the cap being in screw threaded engagement with the stem 30 of the valve body and adapted when screwed home to force the tubular member 28 in engagement with the ring member to hold the parts against vertical displacement. The shoulder 26 and the ring washer 27 are maintained in engagement with the annular shoulder 25 of the thus held stationary ring member by a coiled spring 31, which is interposed between the annular shoulder 25 of the ring member and a collar 32 engaged in a groove 33 in the stem 19. It is thus apparent that the stem is effectually sealed in position and at the same time no great resistance is offered by this sealing arrangement to the turning of the stem for the purpose of operating the valve.

I claim as my invention:

1. In a device of the character described, the combination with a valve casing having a seat therein, a valve threaded into said casing for engagement with said seat, a valve stem for operating said valve, said stem and valve having relative vertical movement, an annular shoulder on said stem, a ring surrounding said stem having an annular seat for said shoulder, a tubular member surrounding said stem and engaging said ring for maintaining the same against vertical displacement, and a cap mounted on the top of said casing and engaging the top of said tubular member for retaining the same in engagement with said ring.

2. In a device of the character described, the combination with a valve casing, of a valve threaded therein, a stem disconnected from said valve for operating said valve and unseating the same, said stem and valve having relative vertical movement, a ring surrounding said stem, an annular shoulder on said stem for engagement with said ring, a tubular holder member surrounding said stem having its lower end for engaging said ring for maintaining the same against vertical displacement, a cap for said casing engaging the upper end of said tubular holding member and a coiled spring for biasing said stem in a position to engage said shoulder with said annular seat.

3. In a device of the character described, the combination with a valve casing having a vertically extending chamber therein provided with an annular shoulder, a valve arranged in said chamber, a valve stem for actuating said valve, said stem and valve having relative vertical movement, a ring surrounding said stem and seated on said shoulder and having an annular seat, an annular shoulder on said valve for cooperation with said annular seat, a tubular member arranged within said chamber for maintaining said ring against said shoulder and against vertical displacement and a cap threaded on the top of said casing and engaging the top of said tubular member to force the same downwardly against said ring.

4. In a device of the character described, the combination with a valve casing, of a valve threaded therein, a valve stem for operating said valve, said stem and valve having relative vertical movement, said casing having a chamber in which said valve stem is arranged and having an annular shoulder, a ring seated on said shoulder and having an annular seat, an annular seat on said valve stem for cooperation with said annular ring seat, a tubular member surrounding said stem and having its lower end engaging said ring for maintaining the same in position, a cap threaded on the valve casing and engaging the upper end of said tubular member, a collar on said stem and a coiled spring surrounding said stem and interposed between said collar and said ring for maintaining the stem in a raised position.

In witness whereof, I EDWIN D. HALE have hereunto set my hand at Oak Park, Illinois, this 15th day of April, A. D. one thousand nine hundred and thirty-one.

EDWIN D. HALE.